United States Patent
Chen et al.

(10) Patent No.: US 12,366,822 B2
(45) Date of Patent: Jul. 22, 2025

(54) RADIAL POLARIZATION CONVERSION COMPONENT, AZIMUTHAL POLARIZATION CONVERSION COMPONENT AND MANUFACTURING METHOD THEREOF

(71) Applicant: FENG CHIA UNIVERSITY, Taichung (TW)

(72) Inventors: Jing Heng Chen, Taichung (TW); Chien Yuan Han, New Taipei (TW); Fan Hsi Hsu, Hsinchu (TW); Kun-Huang Chen, Taichung (TW); Chien Hung Yeh, Taichung (TW); Hung Lung Tseng, Taichung (TW)

(73) Assignee: Feng Chia University, Taichung (TW)

( * ) Notice: Subject to any disclaimer, the term of this patent is extended or adjusted under 35 U.S.C. 154(b) by 588 days.

(21) Appl. No.: 17/752,285

(22) Filed: May 24, 2022

(65) Prior Publication Data

US 2022/0382212 A1  Dec. 1, 2022

(30) Foreign Application Priority Data

May 25, 2021 (TW) ................................. 110118904

(51) Int. Cl.
*G03H 1/02* (2006.01)
*G02B 27/28* (2006.01)
*G03H 1/04* (2006.01)

(52) U.S. Cl.
CPC ......... *G03H 1/0248* (2013.01); *G02B 27/286* (2013.01); *G03H 1/0402* (2013.01); *G03H 2223/18* (2013.01); *G03H 2223/24* (2013.01)

(58) Field of Classification Search
None
See application file for complete search history.

(56) References Cited

U.S. PATENT DOCUMENTS

| | | | | |
|---|---|---|---|---|
| 6,111,842 A | * | 8/2000 | Nishino | G11B 7/139 |
| 2008/0226844 A1 | * | 9/2008 | Shemo | G02B 5/3016 |
| | | | | 359/438 |
| 2022/0382213 A1 | * | 12/2022 | Chen | G03H 1/0248 |

FOREIGN PATENT DOCUMENTS

| | | |
|---|---|---|
| CN | 107783308 A | 3/2018 |
| WO | 2012073413 A1 | 6/2012 |

OTHER PUBLICATIONS

Hsu et al (Prism-hologram-prism sandwiched recording method for polarization-selective substrate mode volume holograms with a large diffraction angle, Optics Express, vol. 26, No. 16, Aug. 6, 2018, pp. 20534-20543) (Year: 2018).*

(Continued)

*Primary Examiner* — Jyotsna V Dabbi
(74) *Attorney, Agent, or Firm* — Rosenberg, Klein & Lee

(57) ABSTRACT

A method for manufacturing a radial or azimuthal polarization conversion component comprises the steps of: placing a holographic recording material between two right-angle prisms, wherein the holographic recording material is divided into at least four sector-shaped areas and is partially shielded, and only one of the sector-shaped areas is exposed each time; allowing a recording light to pass through the right-angle prisms and the exposed sector-shaped area of the holographic recording material and to interfere with a reflected object light on the holographic recording material; rotating the holographic recording material to expose the other sector-shaped areas one by one to be constructed for manufacturing volume holograms with diffraction angles of 48.19 degrees, 60 degrees or about 85 degrees.

2 Claims, 4 Drawing Sheets

(56) References Cited

OTHER PUBLICATIONS

Chen et al (Design and fabrication of a holographic radial polarization converter, Photonics, vol. 7, No. 85, Oct. 1, 2020, pp. 1-10) (Year: 2020).*

* cited by examiner

RADIAL POLARIZATION CONVERSION COMPONENT, AZIMUTHAL POLARIZATION CONVERSION COMPONENT AND MANUFACTURING METHOD THEREOF

FIELD OF THE INVENTION

The present invention relates to a grating structure, and more particularly to a radial or azimuthal polarization conversion component and a manufacturing method thereof.

BACKGROUND OF THE INVENTION

For some equipment such as laser cutting or optical microscopes, the light needs to be highly focused in one place to get good working achievement. However, because light has wave properties, it will produce diffraction during the travel of the medium, that is, it will deviate from its straight traveling direction. If the light cannot be concentrated very highly, it is difficult to meet the requirements of high-precision work.

Therefore, the industry has developed a grating structure that can convert incident light into radially or azimuthally polarized light to be emitted, so as to reduce the occurrence of diffraction. As disclosed in Japanese Patent No. 2012-73413 and Chinese Patent No. CN 107783308A, a conventional radial or azimuthal polarization conversion component includes a plurality of half-wave plates that are in a complex shape to form complementary angles and then combined with each other to form a whole one. Because the material cost of the half-wave plates is very high and the shape and angle of the half-wave plates are too complex, the manufacturing cost is extremely high.

SUMMARY OF THE INVENTION

The primary object of the present invention is to provide a radial or azimuthal polarization conversion component manufactured by using a volume hologram, thereby reducing the technical difficulty of manufacturing and saving the cost.

In order to achieve the above object, the present invention provides a radial polarization conversion component, comprising at least four sector-shaped volume holograms to be combined into a complete circular structure, wherein the volume holograms each enable an incident reconstruction light with a wavelength of 200 to 600 nm to have a diffraction angle of 48.19 degrees or about 85 degrees.

In order to achieve the above object, the present invention provides an azimuthal polarization conversion component, comprising at least four sector-shaped volume holograms to be combined into a complete circular structure, wherein the volume holograms each enable an incident reconstruction light with a wavelength of 200 to 600 nm to have a diffraction angle of 60 degrees.

In order to achieve the above object, the present invention provides a radial polarization conversion component, comprising a complete circular volume hologram, wherein the volume hologram is radially divided into at least four sector-shaped areas, and the sector-shaped areas each enable an incident reconstruction light with a wavelength of 200 to 600 nm to have a diffraction angle of 48.19 degrees or about 85 degrees.

In order to achieve the above object, the present invention provides an azimuthal polarization conversion component, comprising a complete circular volume hologram, wherein the volume hologram is radially divided into at least four sector-shaped areas, and the sector-shaped areas each enable an incident reconstruction light with a wavelength of 200 to 600 nm to have a diffraction angle of 60 degrees.

The present invention provides a method for manufacturing the foregoing radial polarization conversion component or the foregoing azimuthal polarization conversion component, comprising the steps of:

placing a holographic recording material between two right-angle prisms, wherein the holographic recording material is divided into at least four sector-shaped areas and is partially shielded, and only one of the sector-shaped areas is exposed each time;

allowing a recording light with a wavelength of 300 to 850 nm to pass through an electronic shutter, a filter and a collimating lens, the recording light being incident on one of the right-angle prisms, passing through the exposed sector-shaped area of the holographic recording material and the other right-angle prism and being reflected by a reflector to form an object light, the recording light and the object light interfering in the exposed sector-shaped area of the holographic recording material;

rotating the holographic recording material to expose the other sector-shaped areas one by one and repeating the above steps for construction; wherein the right-angle prisms each have a base angle, the relationship between the base angle and the diffraction angle caused by the incident reconstruction light is:

$$\theta_d = 2 \cdot \sin^{-1}\left\{\left(\frac{\lambda_2}{\lambda_1} \cdot \frac{n_{f1}}{n_{f2}} \cdot \frac{d_1}{d_2}\right) \cdot \left[\left(1 - \frac{n_p^2}{n_{f1}^2} \cdot \sin^2\theta_{p1}\right) + \left(\frac{d_2}{d_1} \cdot \frac{n_p}{n_{f1}} \cdot \sin\theta_{p1}\right)^2\right]^{1/2}\right\}$$

where, $\theta_d$ is the diffraction angle when the reconstruction light is incident on the holographic recording material;

$\theta_{p1}$ is the base angle;

$\lambda_1$ is the wavelength of the recording light;

$\lambda_2$ is the wavelength of the reconstruction light;

$n_{f1}$ is the index of refraction of the holographic recording material corresponding to the recording light;

$n_{f2}$ is the index of refraction of the holographic recording material corresponding to the reconstruction light;

$n_p$ is the index of refraction of the right-angle prism corresponding to the recording light;

$d_1$ is the thickness of the holographic recording material before exposure;

$d_2$ is the thickness of the holographic recording material after exposure.

DETAILED DESCRIPTION OF THE PREFERRED EMBODIMENTS

Figure 1:
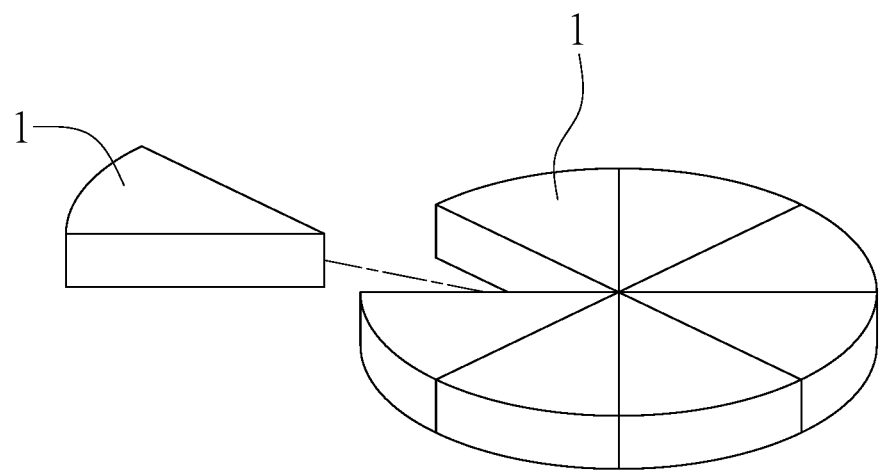
FIG. 1 is a perspective view of a radial or azimuthal polarization conversion component of the present invention.
Figure 3:
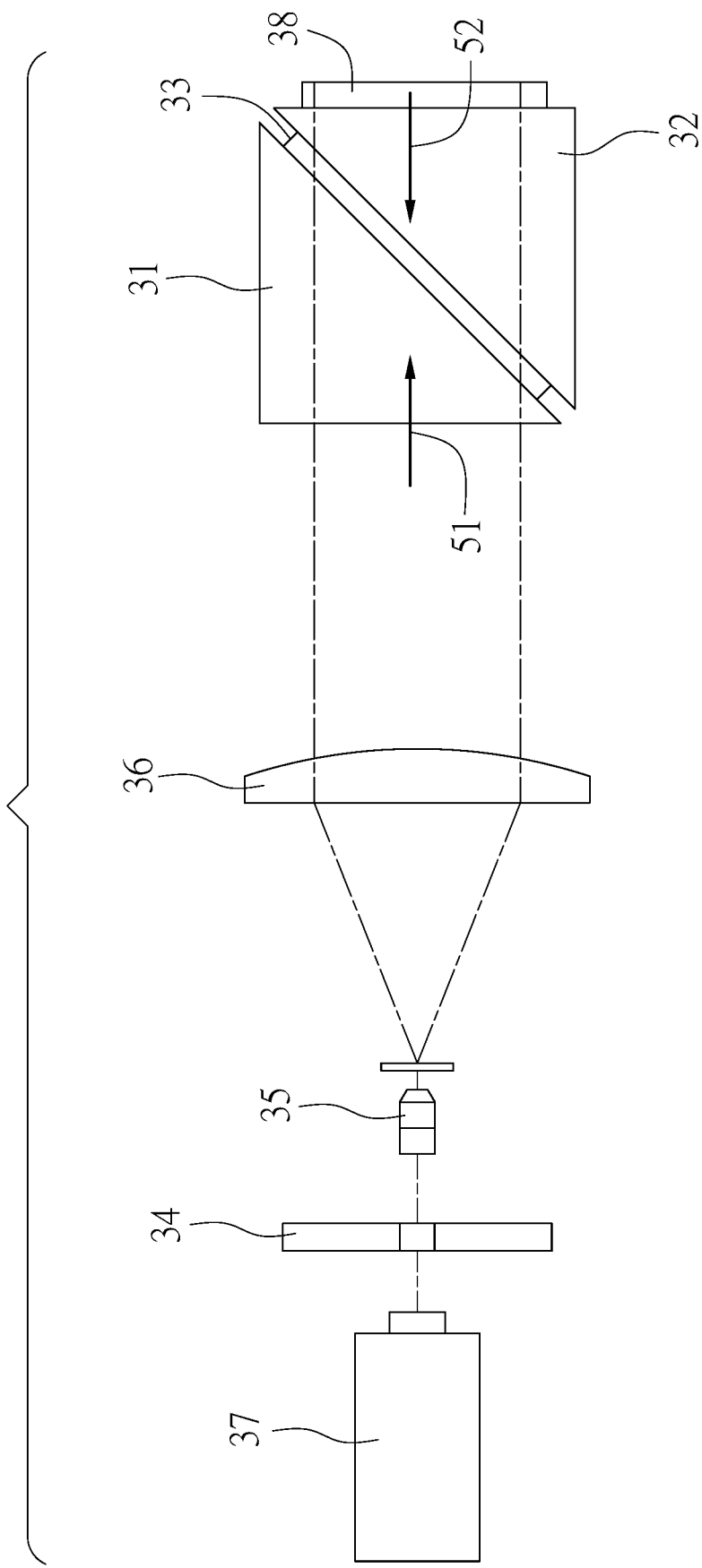
FIG. 3 is a schematic view of an apparatus for manufacturing the radial or azimuthal polarization conversion component of the present invention.

As shown in FIG. 1, the present invention provides a conversion component capable of modifying radially or azimuthally polarized light, which is manufactured by the apparatus as shown in FIG. 3. The conversion component includes two spaced right-angle prisms 31, 32 and a holographic recording material 33 placed between the two right-angle prisms 31, 32. An emitter 37 emits a recording light 51 with a wavelength of 300 to 850 nm to pass through an electronic shutter 34, a filter 35 and a collimating lens 36. The recording light 51 is incident on the right-angle prism 31, passes through the right-angle prism 32 after penetrating the holographic recording material 33, and is then reflected by a reflector 38 to form an object light 52. The recording light 51 and the object light 52 interfere in the holographic recording material 33. Accordingly, after being subjected to an incident reconstruction light with a wavelength of 200 to 600 nm, the holographic recording material 33 can be modified into polarization-selective volume hologram that enables the reconstruction light to be diffracted at an angle of 48.19 degrees, so that the transmitted light can be converted into radially polarized light; or, after being subjected to an incident reconstruction light with a wavelength of 200 to 600 nm, the holographic recording material 33 can be modified into polarization-selective volume hologram that enable the reconstruction light to be diffracted at an angle of 60 degrees, so that the transmitted light can be converted into azimuthally polarized light; or after being subjected to an incident reconstruction light with a wavelength of 200 to 600 nm, the holographic recording material 33 can be modified into polarization-selective volume hologram that enables the reconstruction light to be diffracted at an angle of 85 degrees, so that the transmitted light can be converted into radially polarized light.

Next, the modified volume hologram is cut into a plurality of sectors, and its central angle is less than 60 degrees. In other words, at least four sector-shaped volume holograms 1 are combined to form a complete circular structure as shown in FIG. 1. In this embodiment, the central angle of each sector-shaped volume hologram 1 is 45 degrees. In other words, eight sector-shaped volume holograms 1 are combined to form a complete circular structure, that is, the conversion component for radially or azimuthally polarized light of the present invention is completed.

Figure 2:
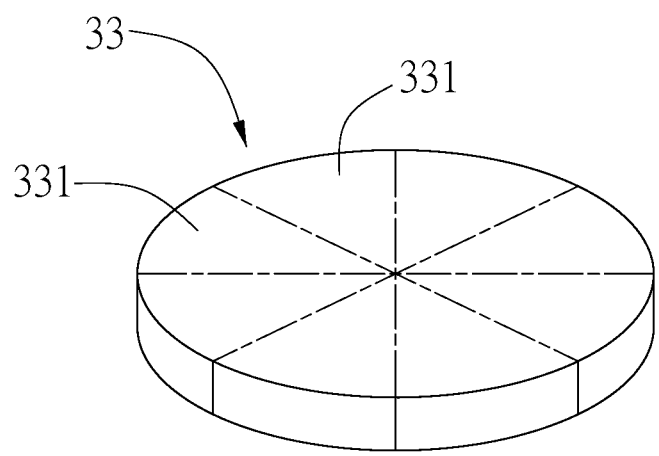
FIG. 2 is a perspective view of another radial or azimuthal polarization conversion component of the present invention.
Figure 4:
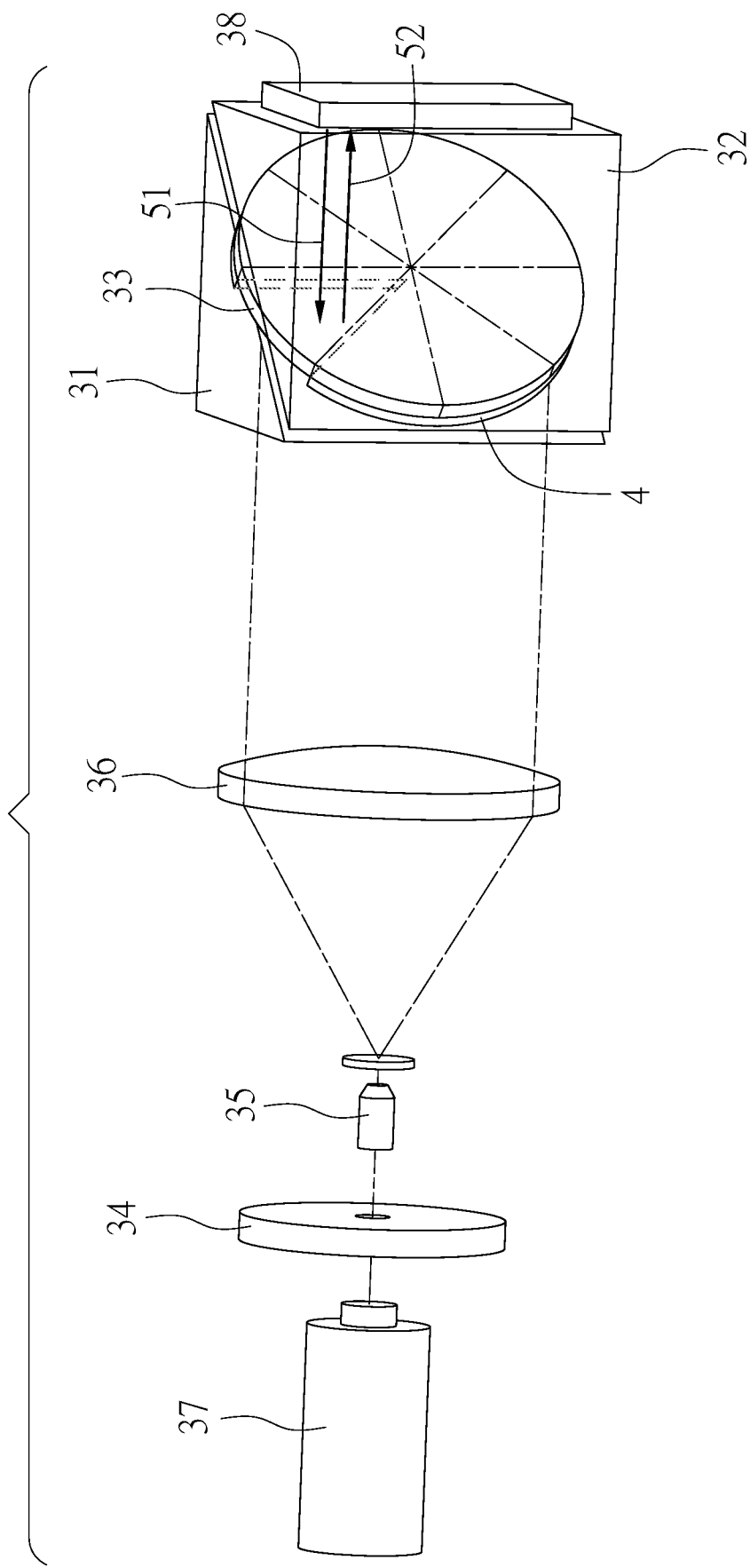
FIG. 4 and FIG. 5 are schematic views showing the process for manufacturing the radial or azimuthal polarization conversion component of the present invention.
Figure 5:
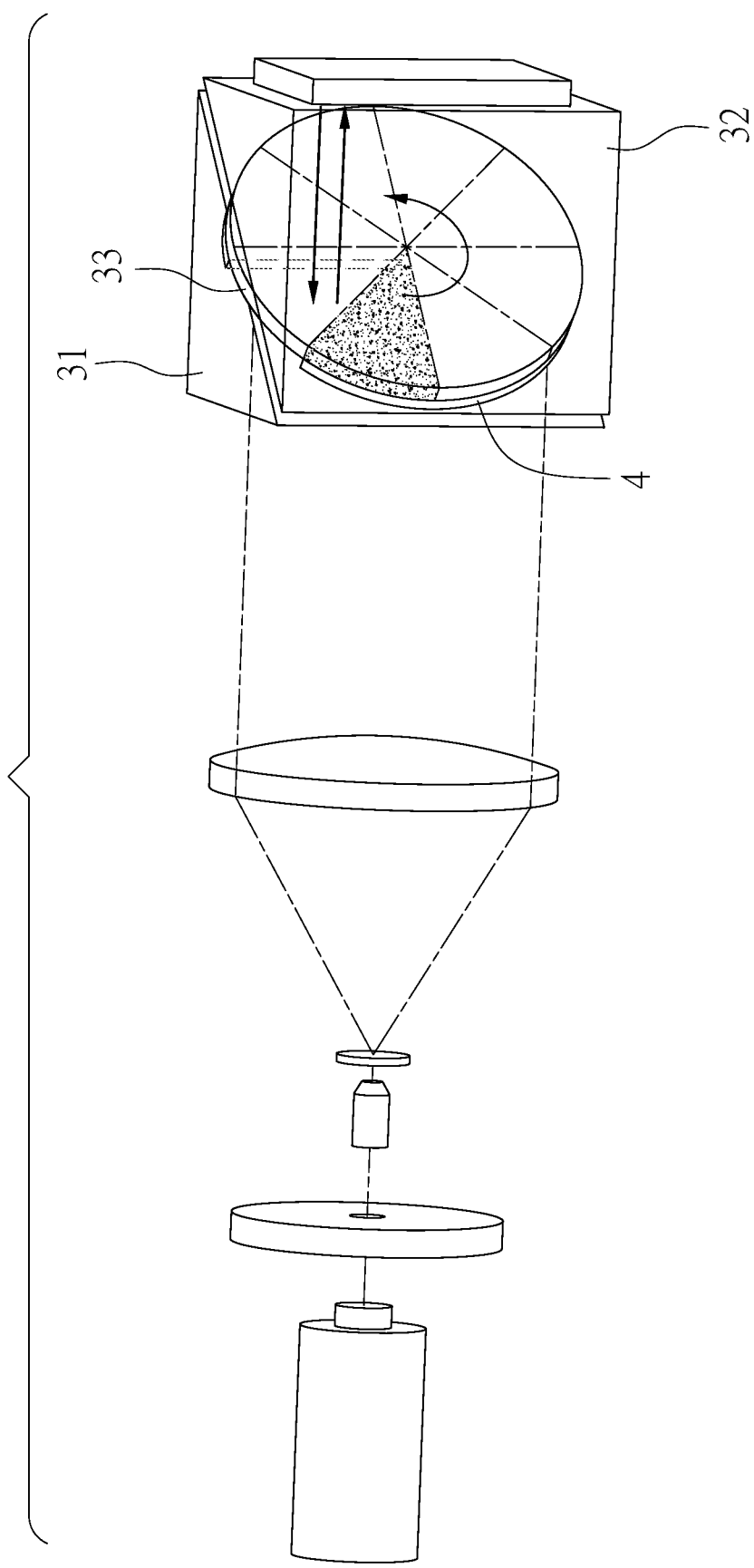

As shown in FIG. 2, the present invention provides a conversion component capable of modifying radially or azimuthally polarized light, which is manufactured by the apparatus as shown in FIG. 3. The conversion component includes two spaced right-angle prisms 31, 32 and a holographic recording material 33 placed between the two right-angle prisms 31, 32. As shown in FIG. 2 and FIG. 4, the holographic recording material 33 has a complete circular shape and defines at least four sector-shaped areas 331. In this embodiment, the holographic recording material 33 defines eight sector-shaped areas 331 each with a central angle of 45 degrees. The holographic recording material 33 is disposed between the two right-angle prisms 31, 32. A cover 4 capable of shielding light is disposed in front of the holographic recording material 33. The cover 4 has a fan shape with a central angle of 315 degrees for covering seven sector-shaped areas of the holographic recording material 33. In other words, the cover 4 can block light from passing through the seven sector-shaped areas shielded by the cover 4, and only one sector-shaped area that is not shielded by the cover 4 can transmit light.

With the above structure, as shown in FIG. 4, an emitter 37 emits a recording light 51 with a wavelength of 300 to 850 nm to pass through an electronic shutter 34, a filter 35 and a collimating lens 36. The recording light 51 is incident on the right-angle prism 31, passes through the right-angle prism 32 after penetrating the holographic recording material 33, and is then reflected by a reflector 38 to form an object light 52. The recording light 51 and the object light 52 interfere in the sector-shaped area that is not blocked by the cover 4 of the holographic recording material 33. Accordingly, after being subjected to an incident reconstruction light with a wavelength of 200 to 600 nm, the sector-shaped area constructed on the holographic recording material 33 can be modified into a grating structure that enables the reconstruction light to be diffracted at an angle of 48.19 degrees, so that the transmitted light can be converted into radially polarized light; or, after being subjected to an incident reconstruction light with a wavelength of 200 to 600 nm, the sector-shaped area constructed on the holographic recording material 33 can be modified into a grating structure that enables the reconstruction light to be diffracted at an angle of 60 degrees, so that the transmitted light can be converted into azimuthally polarized light; or after being subjected to an incident reconstruction light with a wavelength of 200 to 600 nm, the sector-shaped area constructed on the holographic recording material 33 can be modified into a grating structure that enables the reconstruction light to be diffracted at an angle of 85 degrees, so that the transmitted light can be converted into radially polarized light.

Next, the holographic recording material 33 is rotated, so that the seven sector-shaped areas previously shielded are exposed out of the cover 4 one by one for the recording light to pass therethrough one by one to obtain construction, and the eight sector-shaped areas of the holographic recording material 33 are all constructed, that is, the conversion component for radially or azimuthally polarized light of the present invention is completed.

In the apparatus for manufacturing the conversion component for radially or azimuthally polarized light of the present invention, as shown in FIG. 3, each right-angle prism has a base angle $\theta_{p1}$, wherein the relationship between the base angle $\theta_{p1}$ and the diffraction angle $\theta_d$ caused by the incident reconstruction light is:

$$\theta_d = 2 \cdot \sin^{-1}\left\{\left(\frac{\lambda_2}{\lambda_1} \cdot \frac{n_{f1}}{n_{f2}} \cdot \frac{d_1}{d_2}\right) \cdot \left[\left(1 - \frac{n_p^2}{n_{f1}^2} \cdot \sin^2\theta_{p1}\right) + \left(\frac{d_2}{d_1} \cdot \frac{n_p}{n_{f1}} \cdot \sin\theta_{p1}\right)^2\right]^{1/2}\right\}$$

where, $\lambda_1$ is the wavelength of the recording light;
$\lambda_2$ is the wavelength of the reconstruction light;
$n_{f1}$ is the index of refraction of the holographic recording material corresponding to the recording light;
$n_{f2}$ is the index of refraction of the holographic recording material corresponding to the reconstruction light;
$n_p$ is the index of refraction of the right-angle prism corresponding to the recording light;
$d_1$ is the thickness of the holographic recording material before exposure;
$d_2$ is the thickness of the holographic recording material after exposure.

On the actual implementation, the required diffraction angle $\theta_d$ can be set according to the requirements for the conversion efficiency of polarized light, and then the corresponding prism angle $\theta_{p1}$ can be calculated through the above formula, that is, the apparatus conditions of the conversion component for radially or azimuthally polarized light required for construction can be obtained.

The feature of the present invention is that the conversion component for radially or azimuthally polarized light is manufactured by using the volume hologram. The manufacturing technique is less difficult, and has the effect of simple manufacture and cost saving.

What is claimed is:

1. A method for manufacturing a radial polarization conversion component comprising the steps of:

placing a holographic recording material between two right-angle prisms, wherein the holographic recording material is divided into at least four sector-shaped areas and is partially shielded, and only one of the sector-shaped areas is exposed each time;

allowing a recording light with a wavelength of 300 to 850 nm to pass through an electronic shutter, a filter and a collimating lens, the recording light being incident on one of the right-angle prisms, passing through the exposed sector-shaped area of the holographic recording material and the other right-angle prism and being reflected by a reflector to form an object light, the recording light and the object light interfering in the exposed sector-shaped area of the holographic recording material;

rotating the holographic recording material to expose the other sector-shaped areas one by one and repeating the above steps for construction; wherein the right-angle prisms each have a base angle, the relationship between the base angle and the diffraction angle caused by the incident reconstruction light is:

$$\theta_d = 2 \cdot \sin^{-1}\left\{\left(\frac{\lambda_2}{\lambda_1} \cdot \frac{n_{f1}}{n_{f2}} \cdot \frac{d_1}{d_2}\right) \cdot \left[\left(1 - \frac{n_p^2}{n_{f1}^2} \cdot \sin^2\theta_{p1}\right) + \left(\frac{d_2}{d_1} \cdot \frac{n_p}{n_{f1}} \cdot \sin\theta_{p1}\right)^2\right]^{1/2}\right\}$$

where, $\theta_d$ is the diffraction angle when the reconstruction light is incident on the holographic recording material;
$\theta_{p1}$ is the base angle;
$\lambda_1$ is the wavelength of the recording light;
$\lambda_2$ is the wavelength of the reconstruction light;
$n_{f1}$ is the index of refraction of the holographic recording material corresponding to the recording light;
$n_{f2}$ is the index of refraction of the holographic recording material corresponding to the reconstruction light;
$n_p$ is the index of refraction of the right-angle prism corresponding to the recording light;
$d_1$ is the thickness of the holographic recording material before exposure;
$d_2$ is the thickness of the holographic recording material after exposure; and
wherein the radial polarization conversion component includes a complete circular volume hologram, the volume hologram is radially divided into at least four sector-shaped areas, and the sector-shaped areas each enable an incident reconstruction light with a wavelength of 200 to 600 nm to have a diffraction angle of 48.19 degrees or angles within a few degrees of 85 degrees.

2. A method for manufacturing an azimuthal polarization conversion component comprising the steps of:

placing a holographic recording material between two right-angle prisms, wherein the holographic recording material is divided into at least four sector-shaped areas and is partially shielded, and only one of the sector-shaped areas is exposed each time;

allowing a recording light with a wavelength of 300 to 850 nm to pass through an electronic shutter, a filter and a collimating lens, the recording light being incident on one of the right-angle prisms, passing through the exposed sector-shaped area of the holographic recording material and the other right-angle prism and being reflected by a reflector to form an object light, the recording light and the object light interfering in the exposed sector-shaped area of the holographic recording material;

rotating the holographic recording material to expose the other sector-shaped areas one by one and repeating the above steps for construction; wherein the right-angle prisms each have a base angle, the relationship between the base angle and the diffraction angle caused by the incident reconstruction light is:

$$\theta_d = 2 \cdot \sin^{-1}\left\{\left(\frac{\lambda_2}{\lambda_1} \cdot \frac{n_{f1}}{n_{f2}} \cdot \frac{d_1}{d_2}\right) \cdot \left[\left(1 - \frac{n_p^2}{n_{f1}^2} \cdot \sin^2\theta_{p1}\right) + \left(\frac{d_2}{d_1} \cdot \frac{n_p}{n_{f1}} \cdot \sin\theta_{p1}\right)^2\right]^{1/2}\right\}$$

where, $\theta_d$ is the diffraction angle when the reconstruction light is incident on the holographic recording material;
$\theta_{p1}$ is the base angle;
$\lambda_1$ is the wavelength of the recording light;
$\lambda_2$ is the wavelength of the reconstruction light;
$n_{f1}$ is the index of refraction of the holographic recording material corresponding to the recording light;
$n_{f2}$ is the index of refraction of the holographic recording material corresponding to the reconstruction light;
$n_p$ is the index of refraction of the right-angle prism corresponding to the recording light;
$d_1$ is the thickness of the holographic recording material before exposure;
$d_2$ is the thickness of the holographic recording material after exposure; and
wherein the azimuthal polarization conversion component includes a complete circular volume hologram, the volume hologram is radially divided into at least four sector-shaped areas, and the sector-shaped areas each enable an incident reconstruction light with a wavelength of 200 to 600 nm to have a diffraction angle of 60 degrees.

* * * * *